United States Patent
Fasen

(10) Patent No.: US 8,432,635 B2
(45) Date of Patent: Apr. 30, 2013

(54) SERVO WRITE HEAD GAP WIDTH CORRECTION

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 12/865,399

(22) PCT Filed: Jan. 30, 2008

(86) PCT No.: PCT/US2008/052370
§ 371 (c)(1),
(2), (4) Date: Jul. 30, 2010

(87) PCT Pub. No.: WO2009/096949
PCT Pub. Date: Aug. 6, 2009

(65) Prior Publication Data
US 2010/0328802 A1    Dec. 30, 2010

(51) Int. Cl.
*G11B 5/584* (2006.01)
*G11B 21/02* (2006.01)

(52) U.S. Cl.
USPC .................................... 360/77.12; 360/75

(58) Field of Classification Search .................. None
See application file for complete search history.

(56) References Cited

U.S. PATENT DOCUMENTS

| | | | |
|---|---|---|---|
| 6,031,673 A | 2/2000 | Fasen | |
| 6,650,496 B2 * | 11/2003 | Nozieres et al. | 360/63 |
| 6,762,900 B2 | 7/2004 | Bui et al. | |
| 6,879,457 B2 | 4/2005 | Eaton et al. | |
| 7,102,847 B2 | 9/2006 | Bui et al. | |
| 7,724,466 B2 * | 5/2010 | Bui et al. | 360/77.12 |
| 2005/0280923 A1 * | 12/2005 | Bui et al. | 360/77.12 |

FOREIGN PATENT DOCUMENTS

| JP | 60-136070 | 7/1985 |
|---|---|---|
| JP | 2006-048854 | 2/2006 |
| JP | 2006-059461 | 3/2006 |

* cited by examiner

*Primary Examiner* — Andrew L Sniezek

(57) ABSTRACT

A pulse mismatch is measured for servo stripes on magnetic tape written with a servo write head having servo head gaps with different physical sizes. The servo head gaps are separately energized to correct the pulse mismatch so servo stripes written on the magnetic tape are within a predefined tolerance.

12 Claims, 5 Drawing Sheets

SERVO WRITE HEAD GAP WIDTH CORRECTION

FIELD OF THE INVENTION

Embodiments in accordance with the present invention are directed to apparatus, systems, and methods for correcting servo write head gap widths that are introduced in magnetic tape when writing servo stripes on the tape.

BACKGROUND

One technique for backing up data is to record the data onto magnetic tapes, such as magnetic tape using the Linear-Tape Open ("LTO") standard. LTO magnetic tapes typically have at least two sections. A first section stores data, and a second section determines the position of the magnetic tape during reading. This second section contains one or more servo stripes that are tracked by a tape drive to determine the position of the magnetic tape. These servo stripes are recorded on the tape in a right and left sloped pattern during a servo writing process that typically accompanies the manufacture of the magnetic tape.

In conventional tape servo-write heads, a single coil simultaneously creates the right slope and left slope servo stripes. This results in a mismatch of gap widths written onto the tape. Small variations in the widths of servo stripes can cause tape tracking errors. Specifically, differences in the widths of two gaps of the servo head are imprinted onto the width of the stripes written onto the tape. As a result, this difference produces gap width errors while the tape is tracked during reading and writing operations. Gap width errors can also exist between the two gaps resulting in a difference between the positive and negative pulse distances while tracking moving tape.

DETAILED DESCRIPTION

Figure 1:
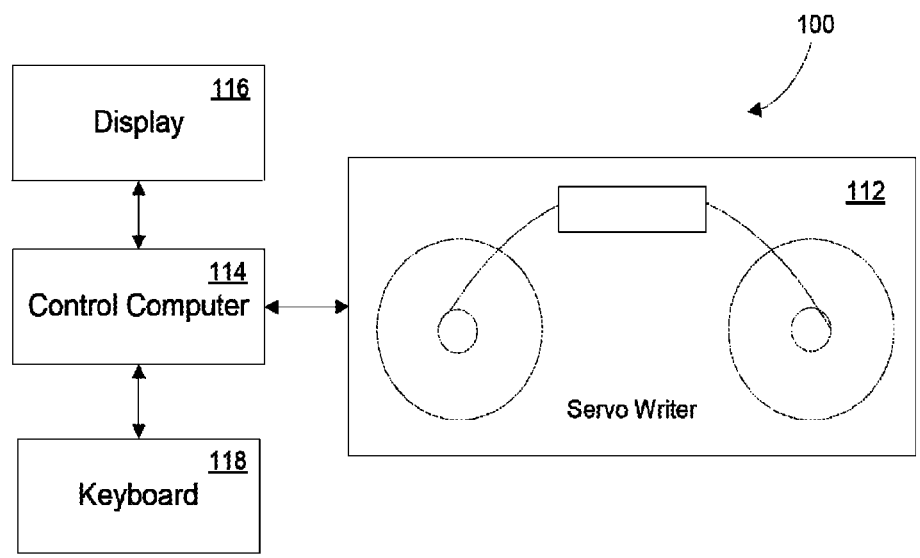
FIG. 1 is a block diagram of an exemplary servo writing system in accordance with one exemplary embodiment of the present invention.

Embodiments in accordance with the present invention are directed to apparatus, systems, and methods for correcting servo write head gap widths that are introduced in magnetic tape when writing servo stripes on the tape. One embodiment uses two separately energized coils to correct differences in physical gap widths by independently setting the write current pulse width for each gap.

In one exemplary embodiment, a servo write head includes two separately energized coils. By way of example, one coil is used to energize a positive six degree gap (i.e., right sloping servo track) and another coil is used to energize a negative six degree gap (i.e., left sloping servo track). The separate coils allow independent writing of the position and speed stripes. Additionally, independent write current pulses used in the separate coil servo write head allow for correction of any physical gap width errors or mismatches by adjusting the write current pulse width driving each coil and gap.

With exemplary embodiments, the written stripes have the proper widths resulting in matching between the positive and negative pulse distances. For instance, if the left gap is wider than desired, the current pulses to the left coil are narrowed to correct for the wider gap. On the other hand, if the right gap is wider than desired, the current pulses to the right coil are narrowed to correct for the wider gap. If both the left and right gaps have an incorrect gap width, both the left and right coil pulse widths are adjusted to correct the written stripe width so both the left and right gaps have equal or identical widths.

As the servo writer head wears down with usage, the gap widths can change. In one exemplary embodiment, the write current pulse widths are periodically re-adjusted to maintain proper written stripe widths.

In one embodiment, a correction to the write current pulse width is determined during setup testing of each new servo write head. Errors in the written stripe width are calculated using the time from the positive to negative read-back pulses from the written stripes. Corrections to the right and left gap write current pulse widths are incorporated before writing production tape. Exemplary embodiments use separately energized gaps to produce servo code fully compliant with current servo code format.

In one embodiment, the write current pulses are adjusted with arbitrarily fine resolution to correct physical gap width errors in the servo write heads. With the separate coil and gap capability, errors in a one or both gaps are corrected. This write pulse width correction allows more accurate matching of the written stripe widths from each of the gaps without tightening the tolerance on the physical gaps and increasing the yield loss for the heads.

By way of example, some exemplary embodiments are described for use with magnetic tapes, such as LTO magnetic tapes. LTO magnetic tapes typically have multiple bands. A first type of band stores the data itself, and a second type of band determines the position of the magnetic tape during reading. This second type of band contains one or more servo stripes that are tracked by the tape drive to determine the position of the magnetic tape. These servo stripes are recorded on the tape in a repeating pattern during a servo writing process that typically accompanies the manufacture of the magnetic tape.

In one embodiment, a repeating servo stripe pattern includes plural right sloped servo stripes (for example, five stripes that are +6 degrees from a direction orthogonal to the direction of the tape's movement), plural left sloped servo stripes (for example, five stripes that are −6 degrees from a direction orthogonal to the direction of the tape's movement), then four right slope servo stripes, then four left slope servo stripes. The position of a head element relative to the tape is calculated by comparing the time between the first of the five right slope servo stripes and the first of the five left slope servo stripes (referred to as "P time") with the time between the first of the five right slope servo stripes and the first of the four right slope servo stripes (referred to as "S time").

Small variations in the widths of servo stripes can cause tape tracking errors. Specifically, differences in the widths of two gaps of the servo head are imprinted onto the width of the stripes written onto the tape. As a result, this difference produces gap width errors while the tape is tracked during reading and writing operations.

Accordingly, exemplary embodiments are directed to correcting servo write head gap widths that are introduced in magnetic tape when writing servo stripes on the tape. More specifically, in one embodiment, there is provided a tape servo writer including a servo write head that has two separately energizable coils. Because the coils are separately energizable, mismatches in the widths of two gaps of the servo head are corrected. This correction eliminates differences in widths of two gaps being imprinted onto the tape.

Turning now to FIG. 1, a block diagram of an exemplary servo writing system in accordance with one embodiment is illustrated and generally designated by a reference numeral 100. However, it will be appreciated that other embodiments of a servo writing system using LTO and other magnetic tape drives fall within the scope of the presently disclosed techniques. As illustrated, the system 100 includes a servo writing machine 112 that creates patterns of servo stripes in the servo bands of a magnetic tape in order to enable positional tracking when the magnetic tapes are later used.

As illustrated, the servo writing system 100 also includes a control computer 114 that controls the operation of the servo writing machine 112. For example, an operator uses the control computer 114 to control the operation of the servo writing machine 112. Towards this end, the servo writing system 100 also includes a display 116 and a keyboard 118 to allow the operator to interact with the servo writing machine 112.

Figure 2:
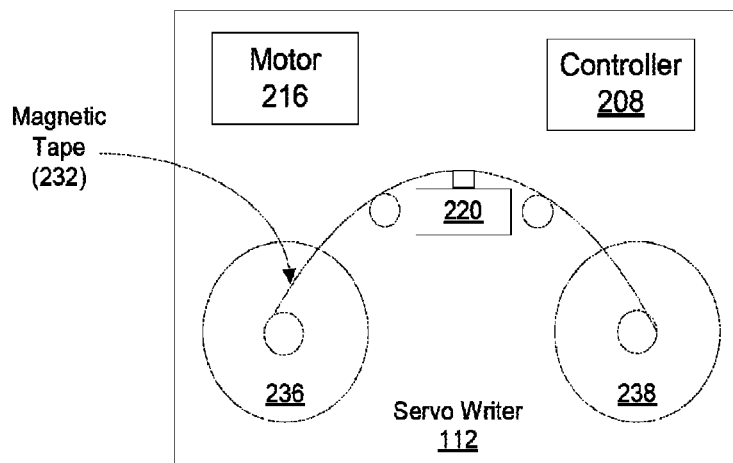
FIG. 2 is a block diagram of an exemplary servo writing machine in accordance with one exemplary embodiment of the present invention.

Turning next to FIG. 2, a more detailed diagram of the exemplary servo writing machine 112 in accordance with one embodiment is illustrated. A motor 216 operates to move magnetic tape 232 from a source reel 236 past the servo write heads 220 and around a take-up reel 238. As will be described in more detail below, in one embodiment, the servo write heads 220 include two separately energizable coils.

The servo write heads 220 are coupled to a processor or controller 208, which may be hardware, software, or a combination or hardware and software. The controller 208 directs the servo write heads 220 to write position stripes ("P stripes") and speed stripes ("S stripes") onto the magnetic tape 232. As described in more detail below, the controller 208 directs or controls the two separately energizable coils of the servo write heads 220 to energize either by themselves or in combination with each other.

Figure 3:
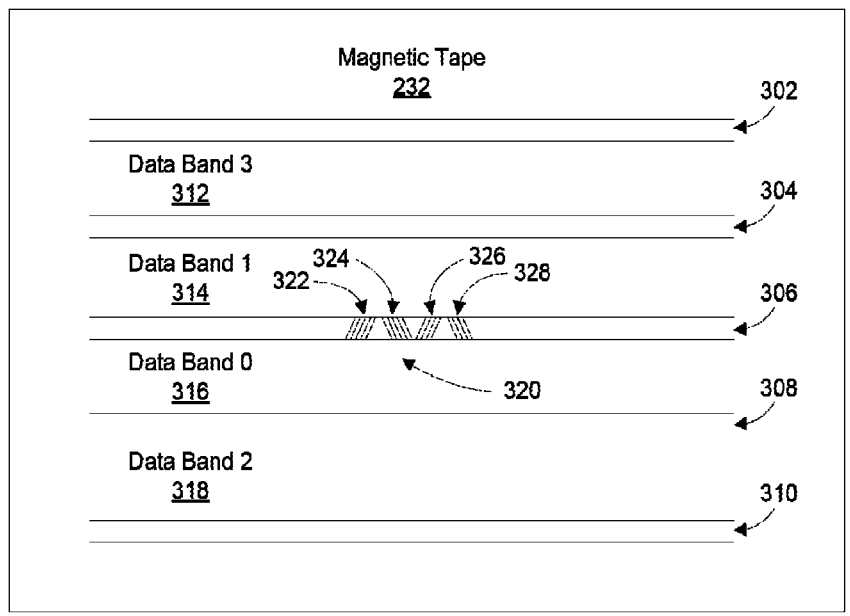
FIG. 3 is a diagram of an exemplary magnetic tape in accordance with one exemplary embodiment of the present invention.

FIG. 3 is a more detailed view of the magnetic tape 232 in accordance with one embodiment. As illustrated, the magnetic tape 232 is split into four separate data bands 312, 314, 316, and 318 ("312-318") into which data from computer system 100 is written. Each data band 312-318 is bordered on each side by servo bands 302, 304, 306, 308, and 310 ("302-310"). In one embodiment, the servo bands 302-310 are each approximately 200 µm in width and enable the tape head to monitor its position relative to the servo bands 302-310, and so, in effect, to monitor the position of the writing elements relative to the centers of the tracks during write operations.

Further, the servo stripe patterns recorded on the servo bands 302-310 enable a tape drive to determine the relative head-tape position during data accesses. Each of the servo bands 302-310 contains a pattern 320 of magnetic stripes, which are written by servo write heads 220. As illustrated, the pattern 320 is written onto the servo bands 302-310 in two sets 322 and 324 of five stripes followed by two sets 326 and 328 of four stripes. The pattern 320 of magnetic stripes is repeated along each servo band 302-310 for the entire length of the magnetic tape.

As shown in FIG. 3, the pattern 320 includes the stripe sets 322, 324, 326, and 328. In one embodiment, the stripe set 322 includes five stripes with a right leaning slope of approximately 6 degrees from a direction orthogonal to the direction of the magnetic tape's 232 movement, and the stripe set 324 includes five stripes with left leaning stripes of approximately −6 degrees from a direction orthogonal to the direction of the magnetic tape's 232 movement. Similarly, the stripe set 326 includes four right leaning stripes, and the stripe set 328 includes four left leaning stripes. It will be appreciated, however, that the five, five, four, four pattern is merely one possible stripe pattern 320. As such, in alternate embodiments, other suitable stripe patterns are used. Moreover, in still other embodiments, the stripe sets 322, 324, 326, and 328 are angled at other suitable slopes or not angled.

Figure 4:
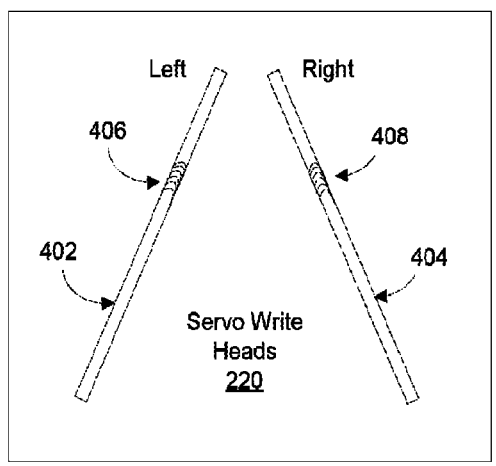
FIG. 4 is a diagram of an exemplary servo write head in accordance with one exemplary embodiment of the present invention.

Turning next to FIG. 4, a more detailed diagram of the servo write head 220 in accordance with one embodiment is illustrated. As shown, the servo write head 220 includes two servo head gaps: a left gap 402 and a right gap 404. The servo head gaps 402 and 404 write the stripes 320 onto magnetic tape 232. The gap 402 has a coil 406 wrapped around it. Similarly, the servo head gap 404 has coil 408 wrapped around it.

As mentioned above, the coils 406 and 408 are separately energizable. Thus, both of the gaps 402 and 404 are independently and separately energized and are, thus, able to write stripes separately on the magnetic tape 232. Using two separately energizable coils (and gaps) generates a stripe pattern 320 in which the tape speed variation is reflected in both the P time and the S time and, as such, a position signal largely free of speed variation noise can be calculated. Moreover, because each of the servo head gaps 402 and 404 are separately energizable, differences in the size or width of the two gaps 402 and 404 can be corrected so servo stripes written onto the tape have equal stripe widths. As such, differences in gap widths (which would otherwise result due to differences in sizes of the gaps 402 and 404) are not imprinted onto the servo stripes of the tape.

Figure 5:
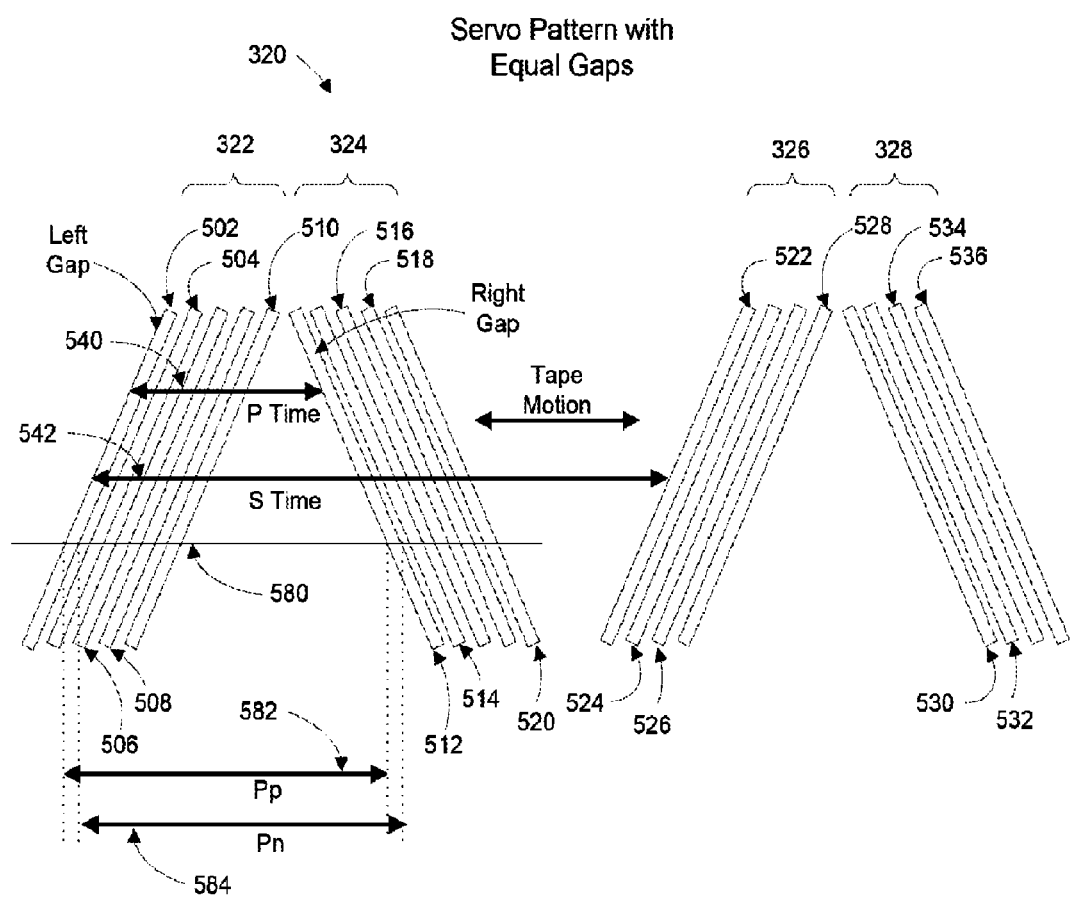
FIG. 5 is a diagram of a servo pattern showing gap widths in accordance with one exemplary embodiment of the present invention.
Figure 6:
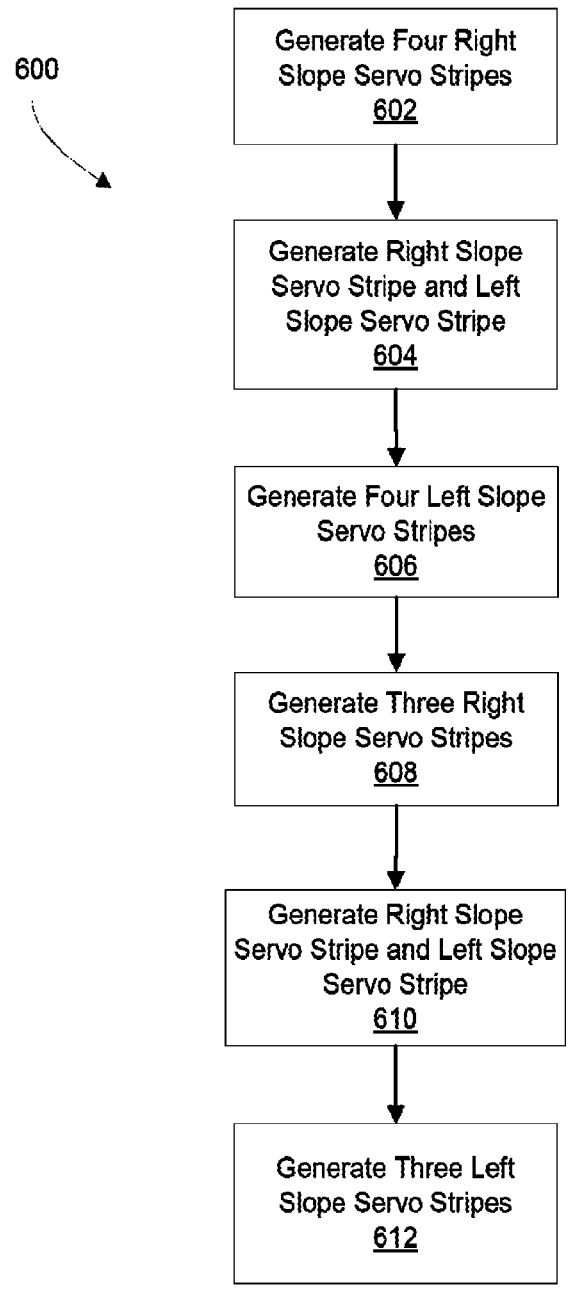
FIG. 6 is a flow chart illustrating an exemplary technique for creating servo stripes onto a magnetic tape in accordance with one exemplary embodiment of the present invention.
Figure 7:
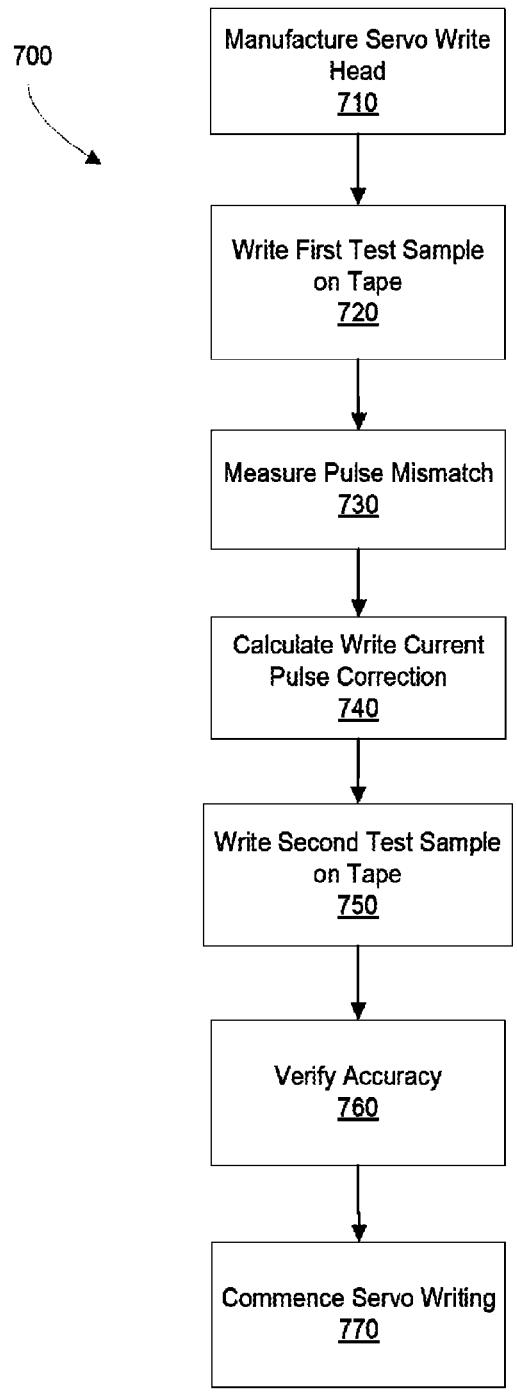
FIG. 7 is a flow chart illustrating an exemplary technique for correcting servo write head gap widths that are introduced in magnetic tape when writing servo stripes on magnetic tape in accordance with one exemplary embodiment of the present invention.

Turning next to FIG. 5, a more detailed diagram of the stripe pattern 320 in accordance with one embodiment is illustrated. Stripe sets 322, 324, 326, and 328 are written to the servo bands 302-310 in the magnetic tape 232 of FIG. 3. In one embodiment, the servo head gaps 402 and 404 of FIG. 4 are energized separately and send current pulses to create stripe sets 322-328 to the magnetic tape 232. For example, FIG. 6 is a flow chart illustrating an exemplary technique 600 for creating the stripe sets 322-328 in accordance with one embodiment and FIG. 7 is a flow chart illustrating an exemplary technique 700 for correcting gap widths. In these embodiments, the controller 208 (see FIG. 2) stores and/or executes code that performs the techniques 600 and 700. For example, in one embodiment, the controller 208 includes a computer readable medium (for example, tangible memory) that stores instructions for executing the methods of FIGS. 6 and 7.

By way of example, the methods of FIGS. 6 and 7 are described in conjunction with FIGS. 3-5. It will be appreciated, however, that in alternate embodiments, other suitable tape drives can employ the techniques or methods.

As illustrated by block 602 of FIG. 6, the technique 600 begins with the left servo head gap 402 generating four right slope stripes 502, 504, 506, and 508 one after another on the magnetic tape 232. Next, both of the servo head gaps 402 and 404 can energize at approximately the same time to generate stripes 510 and 512, as indicated by block 604. After this, the right servo head gap 404 can generate four left slope stripes 514, 516, 518, and 520, as indicated by block 606.

The second set of stripes 522-536 are then created in similar manner, except that one less stripe is generated by each of the servo head gaps 402 and 404. In particular, the left servo head gap 402 generates the right slope stripes 522, 524, and 526 one after another on the magnetic tape 232, as indicated by block 608, and then both of the servo had gap 402 and 404 energize at approximately the same time to generate stripes 528 and 530, as indicated by block 610. Lastly, the right servo head gap 404 generates three left slope stripes 532, 534, and 536, as indicated by block 612. This technique is then repeated until the servo bands of the magnetic tape are filled with servo stripes. The method of FIG. 6 thus creates the servo stripes 502 and 512 at different times and causes the servo stripes 502-536 upon which the P time 540 and S time 542 are based to be written in a manner that is equally affected by tape speed variation.

More specifically, as will be appreciated by those of ordinary skill in the art, the controller 208 (see FIG. 2) calculates the position of the magnetic tape 232 as the ratio of the time between the stripes 502 and 512, the "P time" 540 and the time between the stripes 502 and 522, the "S time" 542. In other words, the position is calculated using a ratio of P/S. Separately energizing servo head gaps 402 and 404 results in P times and S times that both vary based on the speed of the magnetic tape.

FIG. 7 is a flow chart 700 illustrating an exemplary technique for correcting mismatches in servo write head gap widths in accordance with one exemplary embodiment of the present invention.

According to block 710, a servo write head is made or manufactured. As discussed in FIG. 4, the servo head includes two gaps. These gaps can have different or unequal sizes, such as different widths. The difference in widths produces differences in the size of servo stripes being imprinted or written onto magnetic tape. As a result, gap width errors or tape tracking errors occur with the tape.

According to block 720, the servo write head writes a first test sample onto the magnetic tape. By way of example, plural servo stripes are written to the tape in order to determine the accuracy of the stripes being written onto the tape. Specifications require written stripes to be within a specified tolerance to ensure the proper pulse spacing between the positive and negative read-back pulses. For example, LTO specifications require the written stripe width to be 2 μm+/−0.4 μm. Gap width error can also exist between the two gaps and result in a difference between the positive and negative pulse distances.

According to block 730, a pulse mismatch is determined for the servo stripes on the tape. By way of example, a pulse-time-difference (i.e., a delta) is measured. This pulse-time-difference is the difference between the positive pulse distance (Pp) and the negative pulse different (Pn). For instance, FIG. 5 shows a left gap 502 and a right gap 512. A reference line 580 extends lengthwise along the direction of tape motion. The gap width is determined by measuring the difference between the positive pulse distance Pp 582 and the negative pulse distance Pn 584. This difference (or delta) represents gap width error. For illustration, FIG. 5 shows a servo pattern with equal gaps (i.e., no gap width error). In other words, the difference between Pp and Pn (i.e., |Pp−Pn|) is zero or within a specified tolerance.

According to block 740, the write pulse correction is calculated for pulse widths of left and right coil energization. The servo write head includes two separately energized coils: one for the positive six degree gap and one for the negative six degree gap. Separate coils provide independent writing of the position and speed stripes.

The independent write current pulses used in the separate coil servo write head allows for correction of any physical gap width errors or mismatches by adjusting (i.e., increasing or decreasing) the write current pulse width driving each coil and gap. The written stripes have the proper widths resulting in matching between the positive and negative pulse distances. For instance, if the left gap is wider than desired (i.e. Pp>Pn), then current pulses to the left coil are narrowed to correct for the wider gap. If the right gap is wider than desired (i.e., Pp<Pn), then current pulses to the right coil are narrowed to correct for the wider gap. If both the left and right gaps have an incorrect gap width, both the left and right coil pulse widths are adjusted to correct the written stripe width. Thus, adjustments to the write current supplied to the left and/or right gaps compensates for the physical difference in size between these two gaps.

As the servo writer head wears down with usage, the gap widths may change. The write current pulse widths can be readjusted periodically to maintain proper written stripe widths. Further, the correction to the write current pulse width is determined during setup testing of each new servo write head. Errors in the written stripe width are calculated from the time from the positive to negative read-back pulses from the written stripes. Corrections to the right and left gap write current pulse widths are incorporated before writing production tape.

According to block 750, the servo write head writes a second test sample onto the magnetic tape. By way of example, plural servo stripes are written to the tape in order to determine the accuracy of the stripes being written onto the tape.

According to block 760, verification is made as to whether the second test sample is being accurately written and within the specified tolerance to ensure the proper pulse spacing between the positive and negative read-back pulses. By way of example, the pulse-time-difference (i.e., a delta) is again measured. This pulse-time-difference is the difference between the positive pulse distance (Pp) and the negative pulse different (Pn). If the pulse-time-difference is within the predetermined or specified tolerance, then the servo write head is properly writing servo bands.

According to block 770, servo volume writing is commenced with the correction to write and generate tape cartridges. Thus, even though the physical widths of the servo head gaps are different, the heads are able to write servo stripes onto tape such that the written stripes do not exhibit this difference. The difference is corrected by adjusting the current supplied to either or both of the servo gap heads while the stripes are being written to the tape.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or controller of the computer or server from long-term storage media of some type, such as a CD-ROM drive, hard drive, ROM, etc. The software programming code is embodied or stored on any of a variety of known media for use with a data processing system or in any tangible memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   measuring a pulse mismatch for servo stripes on magnetic tape written with a servo write head having servo head gaps with different physical sizes, the servo stripes including a right slope stripe and a left slope stripe, wherein measuring the pulse mismatch is based on determining a difference in a first distance between first edges of the respective right slope and left slope stripes, and a second distance between second edges of the respective right slope and left slope stripes; and
   separately energizing the servo head gaps to correct the pulse mismatch so servo stripes written on the magnetic tape by the servo head gaps are within a predefined tolerance.

2. The method of claim 1 further comprising, independently setting write current pulses that drive the respective servo head gaps.

3. The method of claim 1 further comprising, adjusting write current pulses to only one of the servo head gaps to compensate for the different physical sizes.

4. The method of claim 1 further comprising:
   adjusting a width of at least one write current pulse supplied to at least one of the servo head gaps to reduce the difference between the first and second distances.

5. The method of claim 1, wherein the first distance being different from the second distance is indicative of one of the servo head gaps having a different width than another of the servo head gaps.

6. The method of claim 1, further comprising:
   at a later time after the measuring and the separately energizing, writing, by the servo write head, a further pattern of servo stripes on another magnetic tape;
   measuring a further pulse mismatch for the servo stripes of the further pattern, wherein the further pulse mismatch is caused by wear of the servo write head due to use; and
   adjusting a width of at least one write current pulse supplied to at least one of the servo head gaps to reduce the further pulse mismatch.

7. A system, comprising:
   a first write head for writing positively sloped servo stripes on tape;
   a second write head for writing negatively sloped servo stripes on the tape, wherein the second write head has a different size than the first write head to generate gap width errors on the tape; and
   a controller to:
      measure a first distance between a first edge of a positively sloped servo stripe and a first edge of a negatively sloped servo stripe, measure a second distance between a second edge of the positively sloped servo stripe and a second edge of the negatively sloped servo stripe, wherein a difference between the first distance and the second distance is indicative of the different size, and
      adjust at least one write current pulse width to at least one of the first and second write heads in response to the difference to compensate for the gap width errors so servo stripes written on the tape are within a predefined tolerance.

8. The system of claim 7, wherein the first write head has a first coil that is energized to generate the positively sloped servo stripes and the second write head has a second coil that is energized to generate the negatively sloped servo stripes.

9. The system of claim 7, wherein the first and second write heads are separately and independently energized to write the servo stripes on the tape.

10. The system of claim 7, wherein the gap width errors result from the first and second write heads having different widths.

11. The system of claim 7, wherein the controller is to adjust a current pulse width to the first write head independently of a current pulse to the second write head to compensate for the gap width errors.

12. The system of claim 7, wherein the controller is to further:
   at a later time after the measuring and the adjusting, cause the first and second write heads to write a further pattern of positively sloped and negatively sloped servo stripes on another tape,
   determine presence of further gap width errors on the another tape caused by a changed size of at least one of the first and second write heads due to wear of the at least one of the first and second write heads, and
   further adjust at least one write current pulse width supplied to at least one of the first and second write heads to compensate for the further gap width errors.

* * * * *